United States Patent
Tsai et al.

(10) Patent No.: US 8,422,184 B2
(45) Date of Patent: Apr. 16, 2013

(54) OVERCURRENT RELAY

(75) Inventors: Yuan-Pin Tsai, Taipei (TW); Nanming Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 365 days.

(21) Appl. No.: 12/727,850

(22) Filed: Mar. 19, 2010

(65) Prior Publication Data

US 2011/0228433 A1   Sep. 22, 2011

(51) Int. Cl.
*H02H 3/08* (2006.01)
*H02H 9/02* (2006.01)

(52) U.S. Cl.
USPC .......................................... 361/93.1

(58) Field of Classification Search ............. 361/93.1
See application file for complete search history.

(56) References Cited

U.S. PATENT DOCUMENTS

| | | | |
|---|---|---|---|
| 4,731,691 A * | 3/1988 | Padwa | 361/87 |
| 6,738,246 B1 * | 5/2004 | Strumpler | 361/93.1 |
| 2006/0170432 A1 * | 8/2006 | Adolfsson et al. | 324/658 |
| 2009/0284182 A1 * | 11/2009 | Cencur | 315/307 |
| 2010/0128133 A1 * | 5/2010 | Lee | 348/208.5 |

* cited by examiner

*Primary Examiner* — Dharti Patel

(57) ABSTRACT

An overcurrent relay able to detect a failure current and rapidly generate a driving signal to drive a circuit breaker in response to the failure current is disclosed. The overcurrent relay has at least one Hall sensor detecting a failure current and outputting a Hall voltage signal; a filter filtering the Hall voltage signal to output a filtered signal having only an exponent wave; a reference voltage provider providing a reference voltage; a comparator comparing the filtered signal with the reference voltage and outputting a trigger signal when the filtered signal reaches the reference voltage; and a circuit breaker driver being triggered by the trigger signal to output a driving signal for driving a circuit breaker.

14 Claims, 16 Drawing Sheets

US 8,422,184 B2

OVERCURRENT RELAY

TECHNICAL FIELD OF THE INVENTION

The present invention relates to an overcurrent relay, more particularly, to an overcurrent relay using a Hall sensor.

BACKGROUND OF THE INVENTION

In a power system, an overcurrent relay is used to transfer a failure current from a failed power line, for example, into a signal instructing a circuit breaker to disconnect the failed power line from the power system so as to protect the whole power system from being damaged by the failure current. FIG. 1 is a schematic block diagram showing a general protection circuit 10 including a relay 15. In the protection circuit 10, as commonly known, a current transformer (CT) 13 is used to detect a failure current from an AC (Alternating Current) bus 21. When a failure occurs in an apparatus connected with the AC bus 21, a great current may flow through the AC bus 21 and results in damage to a power system (not shown) connected with the AC bus 21. The relay 15 transfers the failure current detected by the CT 13 into a signal and passes the signal to a circuit breaker 17. The circuit breaker 17 then operates to isolate the AC bus from the power system.

As known, the CT 13 has an iron core. Accordingly, a magnetic hysteresis phenomenon exists. When detecting a great overcurrent, a distortion may occur in the sensed current waveform due to a non-liner CT-exciting current, which leads to saturation of the magnetic flux in the CT 13. Such a distortion may cause a time delay to the cut-off of the circuit breaker 17.

FIG. 2 shows protection curves of different conventional relays. In this plot, the horizontal axis is the current level, and the vertical axis is the cut off trip time. As can be seen, the protection curves are parabolic curves. Different relay characteristics may result in parabolic curves with different curvatures. When a power system utilises various relays manufactured by different manufacturers, to avoid interference between the protection curves, a considerable time interval must be kept between two adjacent protection curves with respect to the diversity of the relays. When a distortion of the CT sensing occurs, an improper circuit breaker may be driven to operate due to the time delay resulted from the CT sensing distortion.

FIG. 3 shows ideal three-phase CT current waveforms during a power line failure. As can been seen, for each phase, an envelope of the CT current should have a smooth curve. FIG. 4 shows a distorted CT current waveform in one phase during the same power line failure. As shown, the envelope is significantly deformed.

As mentioned above, the magnetic saturation of the CT 13 leads to a time delay, and therefore the relay 15 cannot respond to the failure current immediately. Accordingly, power supplying quality and system safety are both affected. It will be high appreciated if a solution can be provided to solve the above problem.

SUMMARY OF THE INVENTION

An objective of the present invention is to provide an overcurrent relay, which is able to detect a failure current and rapidly generate a driving signal to drive a circuit breaker in response to the failure current.

In accordance with the present invention, the overcurrent relay comprises at least one Hall sensor detecting a failure current and outputting a Hall voltage signal; a filter filtering the Hall voltage signal to output a filtered signal having only an exponent wave; a reference voltage provider providing a reference voltage; a comparator comparing the filtered signal from the filter with the reference voltage and outputting a trigger signal when the filtered signal reaches the reference voltage; and a circuit breaker driver being triggered by the trigger signal to output a driving tripping signal for driving to trip a circuit breaker.

The overcurrent relay of the present invention can be parted into a main part, a sensing part and a transferring part. The Hall sensors are provided in the sensing part. The sensing part is separate from the main part when not in use, while is connected with the main part when being used. The transferring part can also be separate from the main part when not in use, while is connected with the main part when being used. The transferring part transfers the Hall voltage signal of the Hall sensor(s) into a digital signal and further an optical signal for further use.

BRIEF DESCRIPTION OF THE DRAWINGS

The present invention will be described in detail in conjunction with the appending drawings, in which.

DETAILED DESCRIPTION OF THE INVENTION

The present invention utilizes at least one Hall sensor to detect a failure current so as to avoid using a current transformer (CT). Accordingly, the time delay problem due to the CT saturation can be eliminated.

Figure 1:
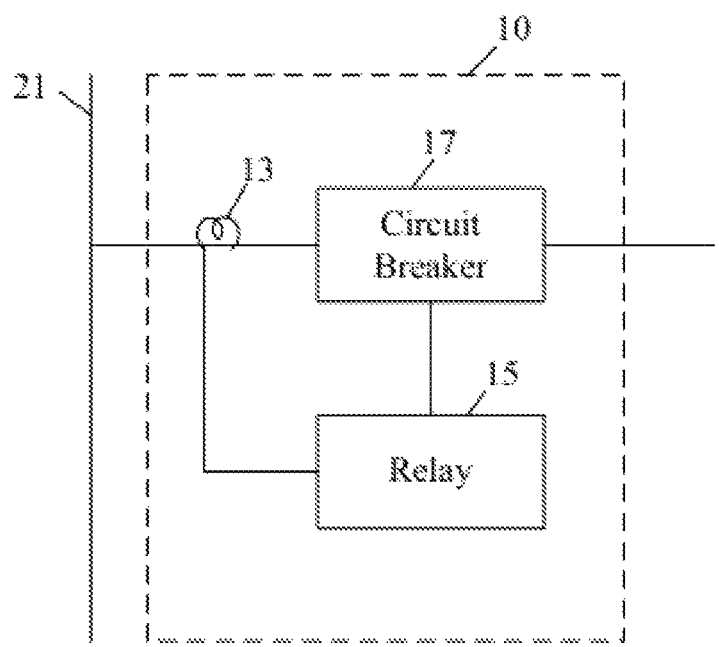
FIG. 1 is a schematic block diagram showing a general protection circuit including a conventional relay.
Figure 2:
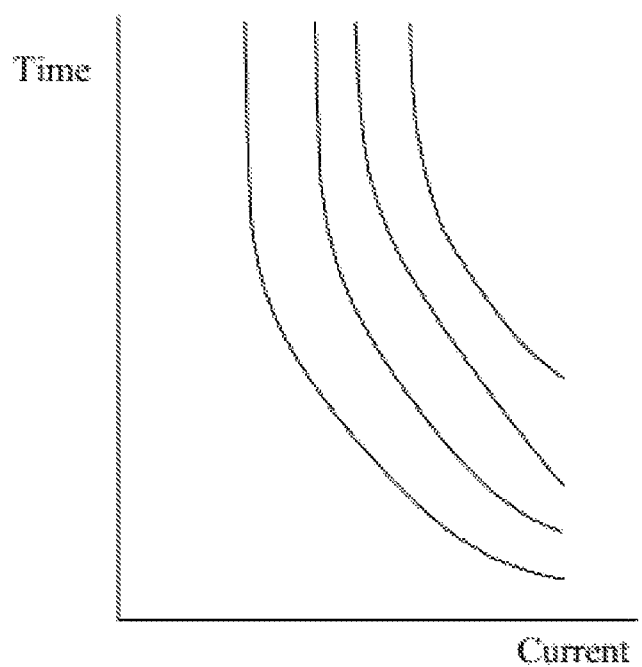
FIG. 2 shows protection curves of different conventional relays.
Figure 3:
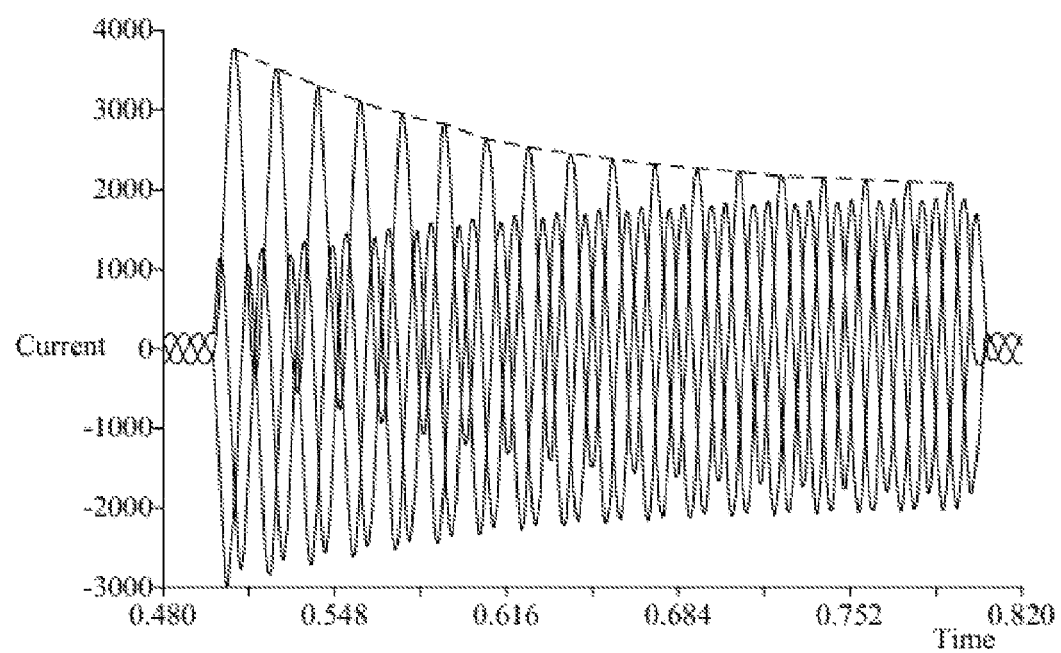
FIG. 3 shows ideal three-phase CT current waveforms during a power line failure.
Figure 4:
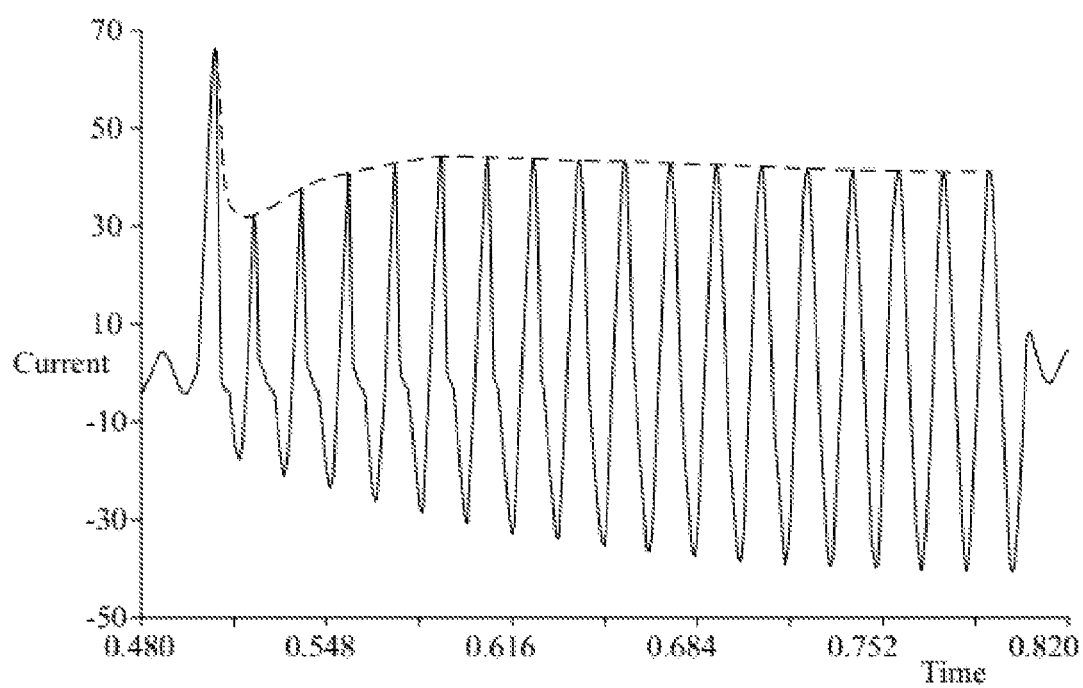
FIG. 4 shows a distorted CT current waveform in one phase during the power line failure.
Figure 5:
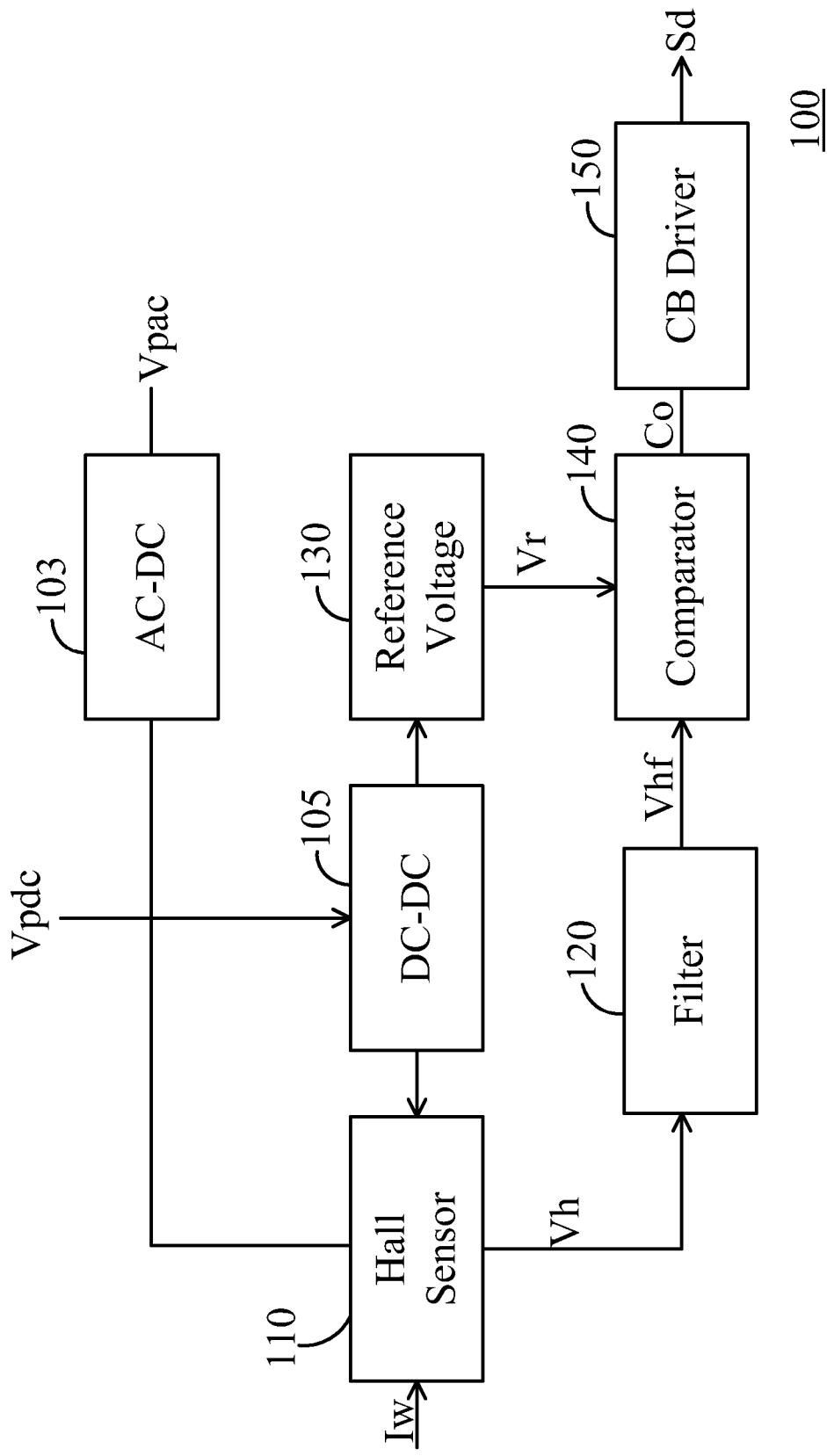
FIG. 5 is a schematic block diagram showing an overcurrent relay in accordance with an embodiment of the present invention.
Figure 6:
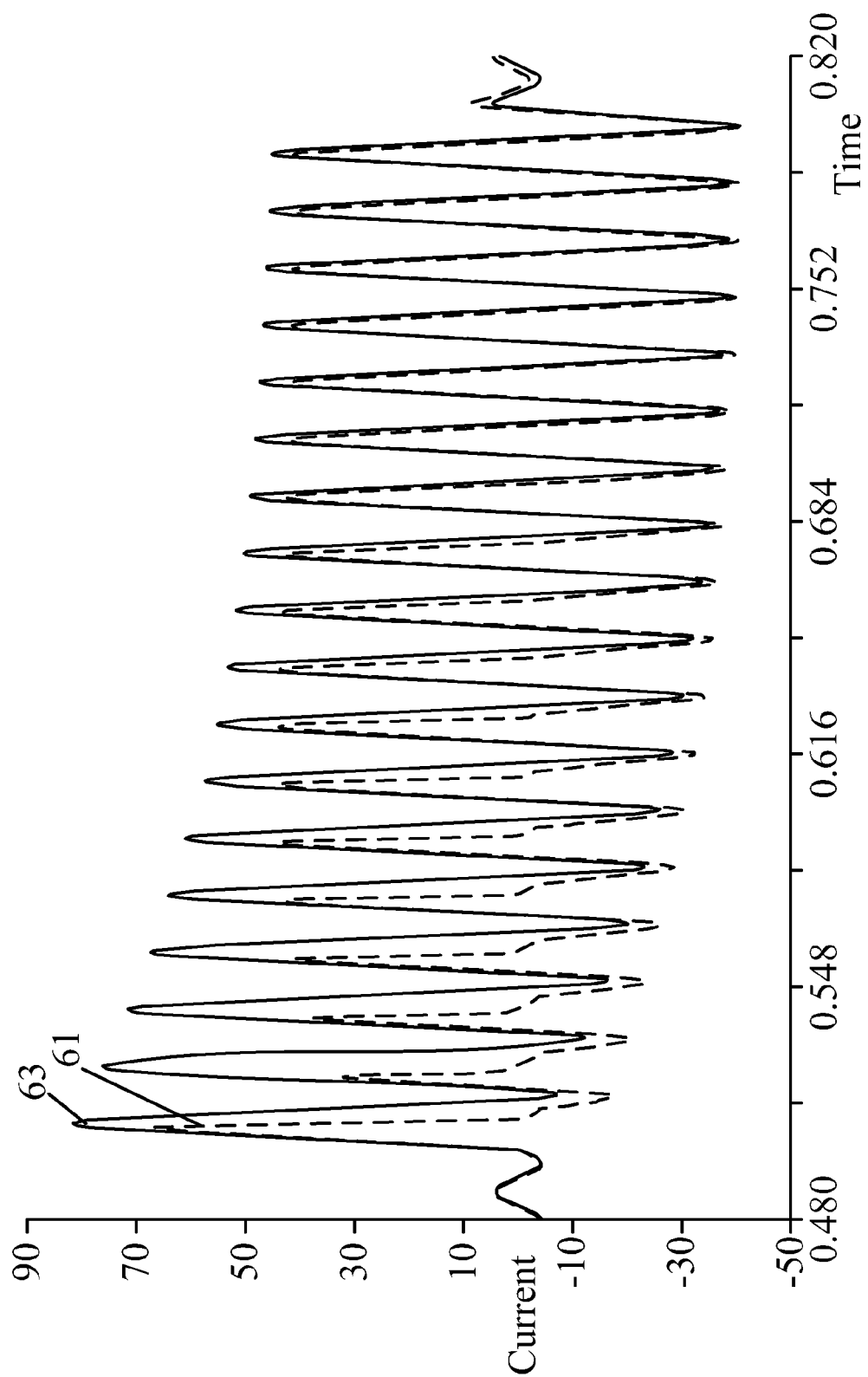
FIG. 6 shows failure current waveforms sensed by the conventional CT and the Hall sensor in accordance with the present invention.

FIG. 5 is a schematic block diagram showing an overcurrent relay 100 in accordance with an embodiment of the present invention. The overcurrent relay 100 has a Hall sensor 110 for detecting a failure current from a power line or the like. The Hall sensor is a widely known device. The Hall sensor senses a magnetic flux density due to a current flowing in a power system and generates a Hall field, and thereby a Hall voltage signal can be obtained. The Hall sensor 110 transfers a sensed current into a Hall voltage. The Hall sensor 110 has no iron core, and therefore no distortion will occur even when the amplitude of the failure current is very great. FIG. 6 shows a failure current waveform 61 sensed by the conventional CT and a failure current waveform 63 sensed by the Hall sensor 110 in accordance with the present invention. As can been seen, the failure current waveform detected by the overcurrent relay 100 of the present invention approaches the actual failure current waveform.

Figure 7:
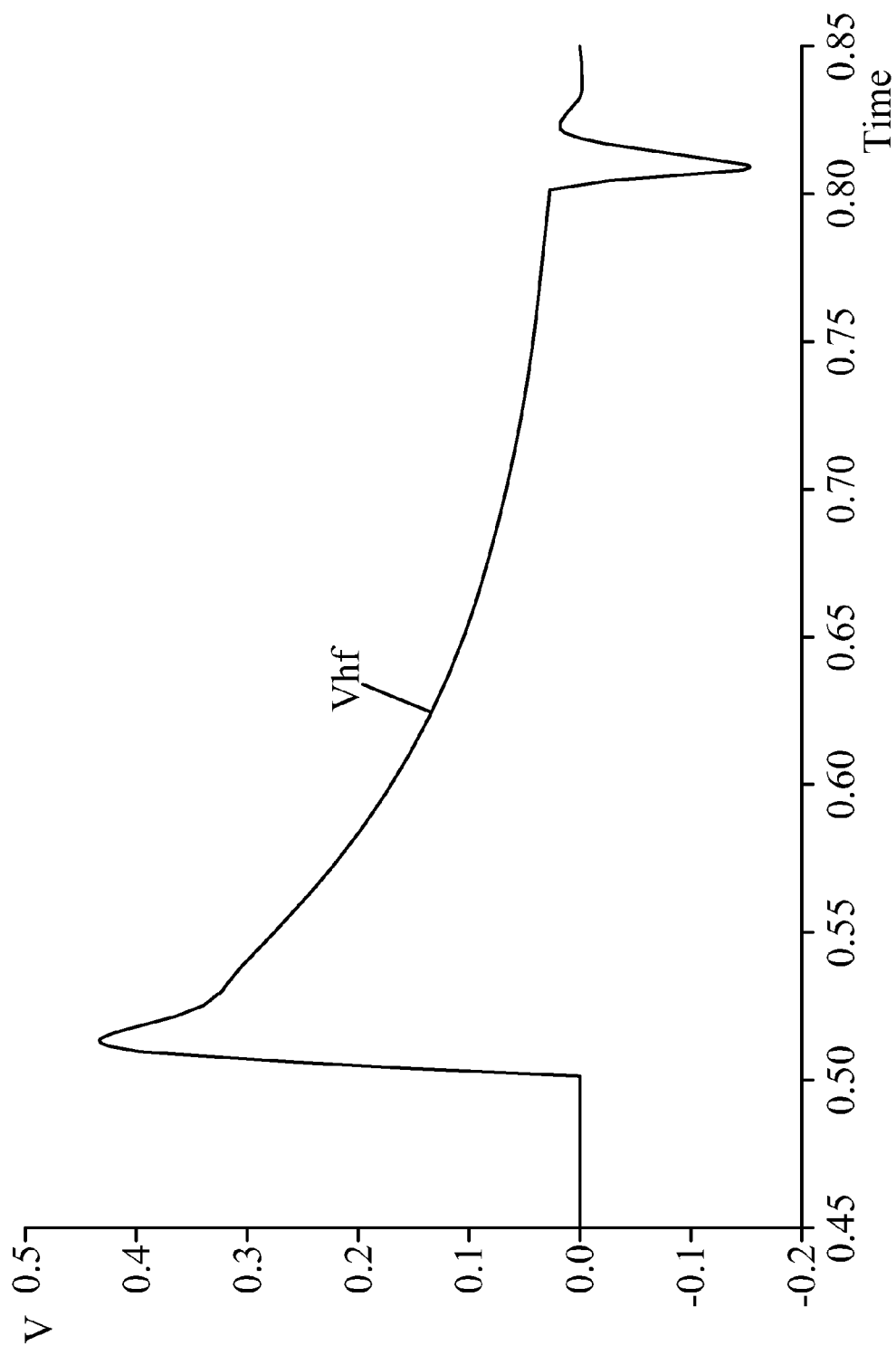
FIG. 7 shows a waveform of a filtered Hall voltage signal in which a sinusoid wave has been filtered out by a filter.

Taking a three-phase power system for example, when a failure occurs to a power line (not shown) of the power system, a current waveform thereof includes not only a great AC failure current but also an exponential decay wave. That is, a Hall voltage signal Vh of the Hall sensor 110 in response to the failure current Iw includes a sinusoid wave and an exponent wave. In the overcurrent relay 100, a filter 120 is used to filter out the sinusoid wave of the Hall voltage signal Vh. A filtered signal Vhf output from the filter 120 contains only the exponent wave. FIG. 7 shows a waveform of Vhf.

The output Vhf of the filter 120 is compared with a reference voltage Vr by a comparator 140. The reference voltage is provided by a reference voltage provider 130.

Figure 8:
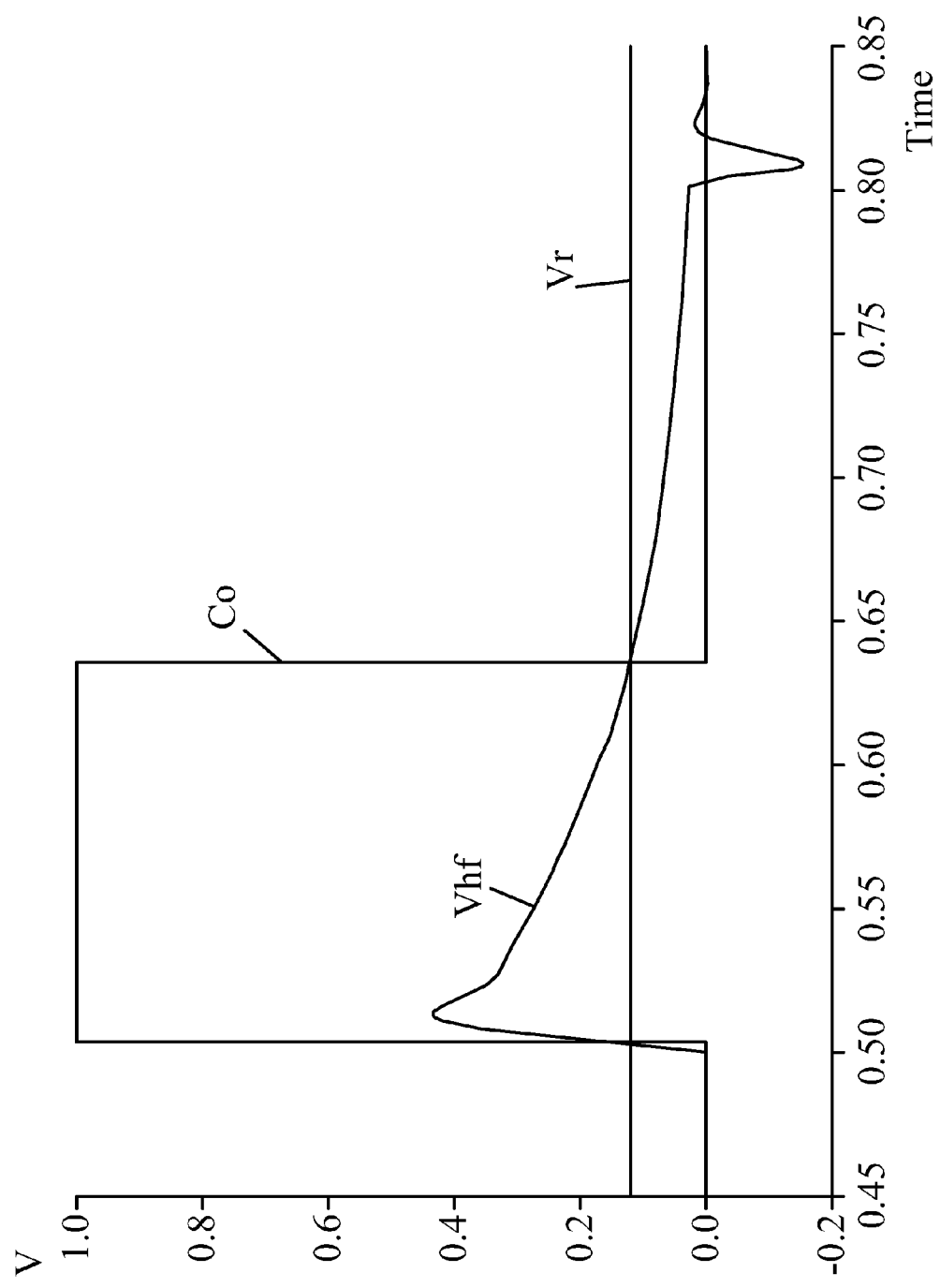
FIG. 8 shows waveforms of a filtered Hall voltage signal Vhf, a reference voltage Vr and a driving signal Sd of the overcurrent relay in accordance with the present invention.

Once the level of the exponent wave of the filtered Hall voltage signal Vhf reaches the reference voltage Vr, the comparator 140 outputs a trigger signal Co to trigger a circuit breaker driver 150. The exponent wave rises very sharply and steeply in the beginning. The trigger signal Co, which is a simple square wave pulse, can be obtained in a few ms when a failure current occurs. As a result, the circuit breaker driver 150 can be triggered to trip the circuit breaker in a very short period of time once a failure current is detected. The circuit breaker driver 150 generates a tripping signal Sd when it is triggered. The tripping signal Sd is used to drive a circuit breaker (not shown) to isolate the failed power line from the power system. FIG. 8 shows waveforms of the filtered signal Vhf, the reference voltage Vr and the trigger signal Co. The trigger signal Co is a square wave, e.g. a pulse. The rising edge of the square wave Co triggers the circuit breaker driver 150, which can be implemented by a thyristor, so as to trip the circuit breaker (not shown).

An AC power Vpac or a DC power Vpdc is supplied to the overcurrent relay 100. For example, the power Vpac can be a 115V AC voltage. The AC voltage is converted into a DC voltage with a proper level (e.g. 5V) by an AC-DC rectifier 103. The low DC voltage is supplied to the Hall sensor 110 and the reference voltage provider 130. The reference voltage provider 130 receives the DC voltage of 5V, for example, and outputs the reference voltage Vr of a required level. Preferably, the reference voltage provider 130 is steplessly adjustable so as to provide various required reference voltages.

The overcurrent relay 100 can also be used in a direct current (DC) power system. The waveform of a DC failure current has no sinusoid wave. Therefore, the output Vhf of the filter 120 is just similar to the Hall voltage signal Vh of the Hall sensor 110. It is noted that the waveform of the filtered signal Vhf under such a circumstance still has a sharply rising section. Therefore, the overcurrent relay 100 still can rapidly response to a failure current. In the case that the overcurrent replay 100 is applied to the DC power system, a DC-DC converter 105 is used to convert the high power voltage Vpdc (e.g. 115V) into a low voltage (e.g. 5V) and provide the latter to the Hall sensor 110 and the reference voltage provider 130. To be adaptable for both AC and DC power supplies, it is preferred that the overcurrent relay 100 contains both the AC-DC rectifier 103 and the DC-DC converter 105.

Figure 9:
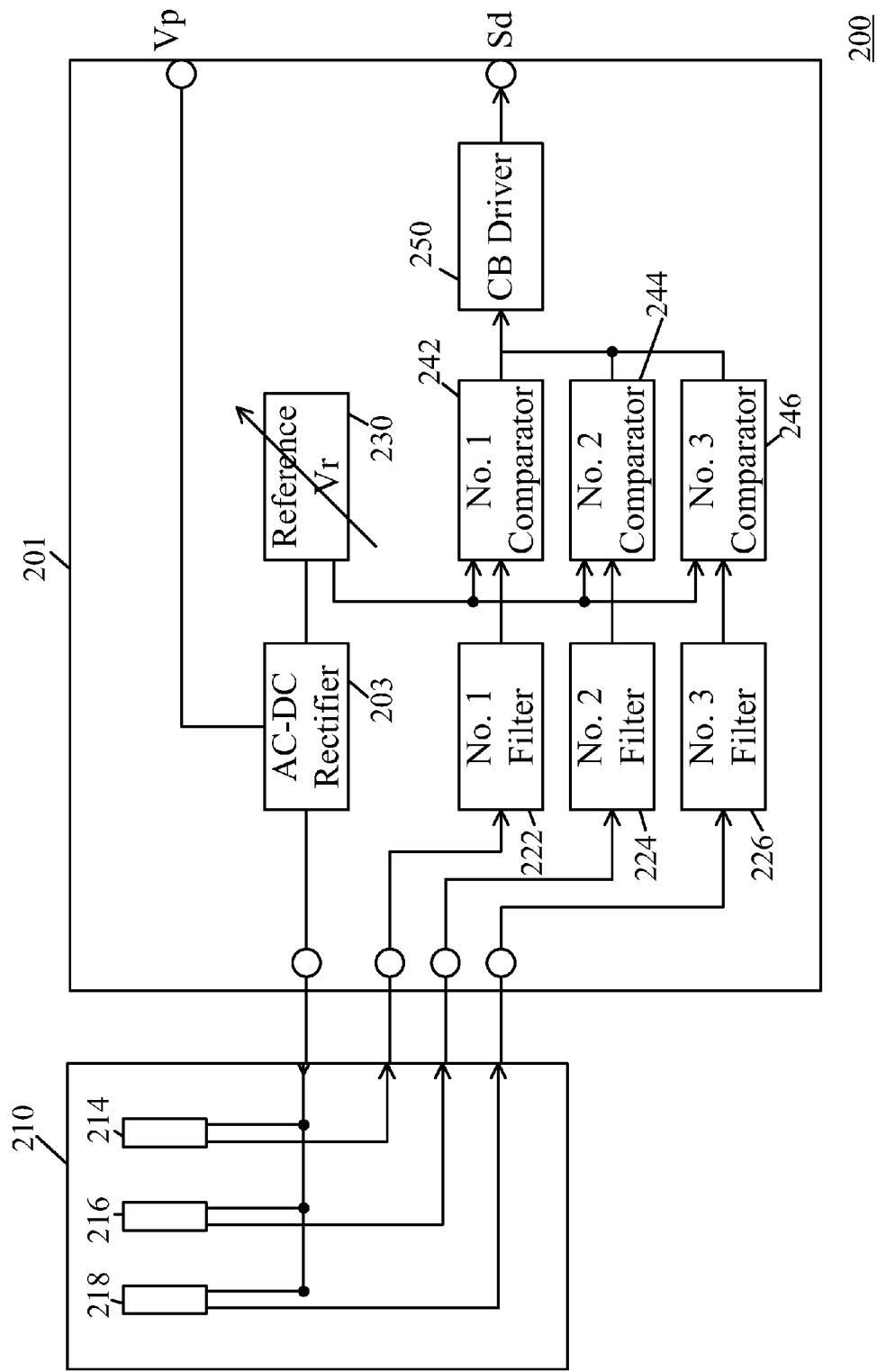
FIG. 9 is a schematic block diagram showing an overcurrent relay in accordance with another embodiment of the present invention.

FIG. 9 is a schematic block diagram showing an overcurrent relay 200 in accordance with another embodiment of the present invention. In this embodiment, an overcurrent sensing part 210 having a plurality of Hall sensors (e.g. Hall sensors 214, 216, 218) is provided outside an overcurrent relay main part 201 of the overcurrent relay 200. The Hall sensors 214, 216, 218 can be set to surround a power cable of each phase, for example, for detecting three-phase failure currents. The overcurrent relay main part 201 has three filters 222, 224, 226 and three corresponding comparators 242, 244, 246 for three-phase. The filters 222, 224, 226 respectively filter Hall voltage signals Vh1, Vh2, Vh3 of the Hall sensors 214, 216, 218 and output filtered signals Vhf1, Vhf2, Vhf3. The comparators 242, 244, 246 respectively compare the filtered signals Vhf1, Vhf2, Vhf3 with a reference voltage Vr provided by a reference voltage provider 230. When any of the filtered signals Vhf1, Vhf2, Vhf3 reaches the reference voltage Vr, it means a failure current occurs in three-phase power system. The corresponding one of the comparators 242, 244, 246 outputs a trigger signal Co in a form of a square wave (e.g. a pulse) to trigger a circuit breaker driver 250, which can be implemented by a thyristor. The circuit breaker driver 250 is triggered to generate a tripping signal Sd to trip a circuit breaker (not shown), so that the circuit breaker operates to isolate a region where the failure occurs.

In FIG. 9, the overcurrent relay 200 only has an AC-DC rectifier 203 for converting an AC high voltage (e.g. 115V) into a DC low voltage (e.g. 5V). However, the overcurrent relay 200 may alternatively contain a DC-DC converter (not shown) for converting a DC high voltage into a DC low voltage, or contain both the AC-DC rectifier 203 and the DC-DC converter.

Figure 10:
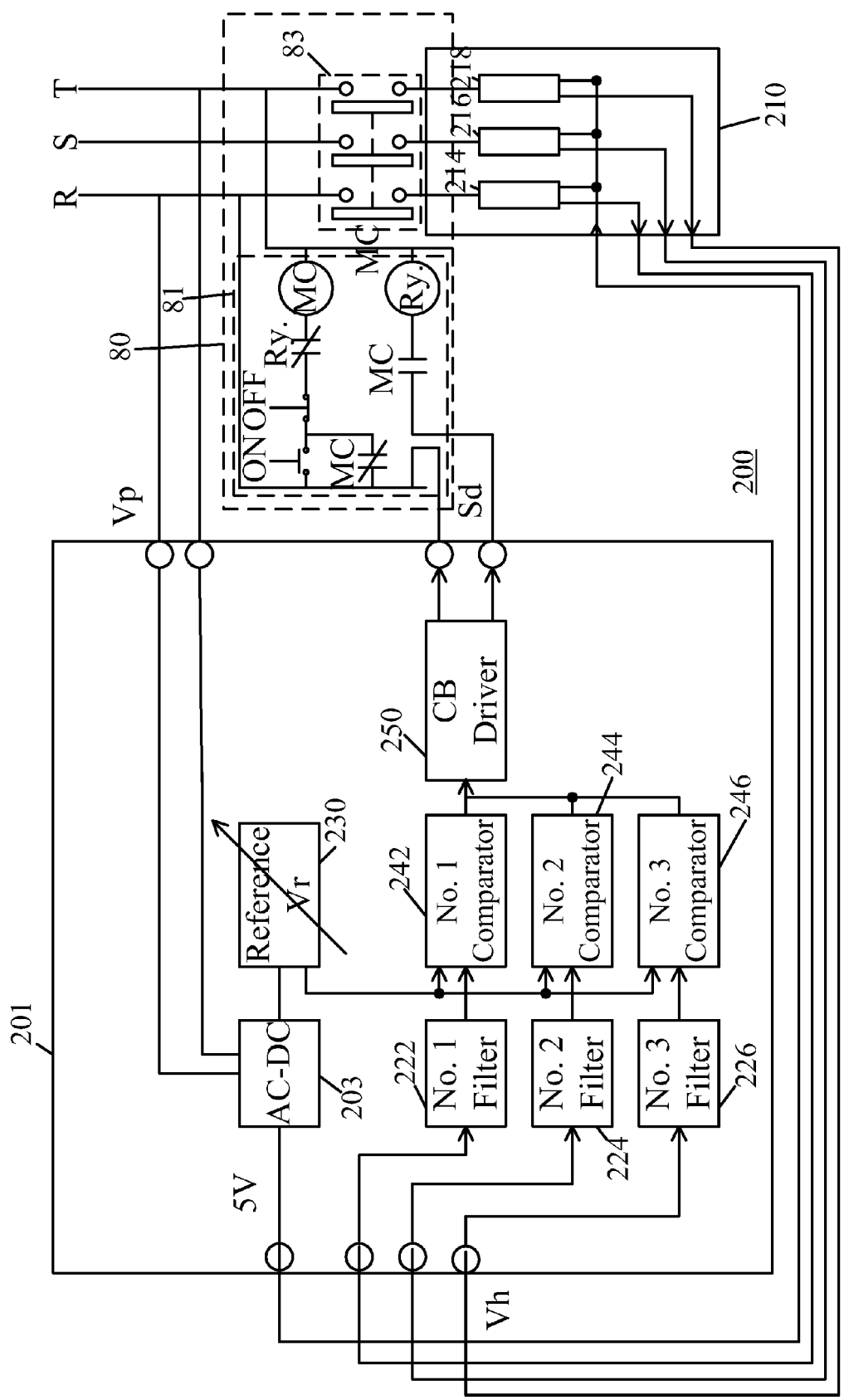
FIG. 10 is a schematic block diagram showing an application example of the overcurrent relay of FIG. 9.
Figure 11:
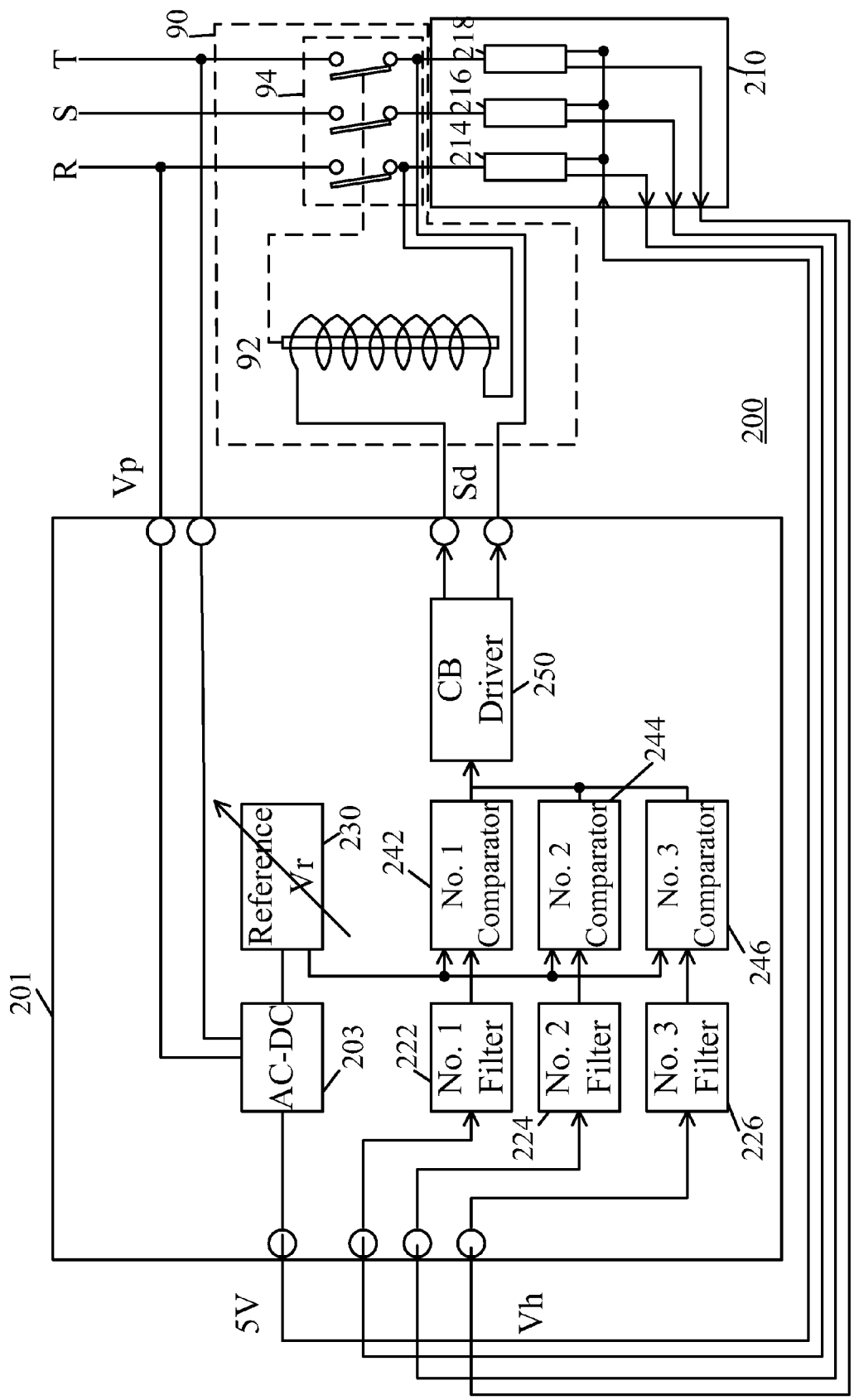
FIG. 11 is a schematic block diagram showing another application example of the overcurrent relay of FIG. 9.

The overcurrent relay of the present invention can be used in combination with other conventional protection devices. FIGS. 10 and 11 are schematic block diagrams showing two application examples of the overcurrent relay 200 of FIG. 9. In FIG. 10, the overcurrent relay 200 cooperates with a conventional magnetic collector (MC) tripping protection circuit 80, which is applied to a load such as a three-phase motor. The Hall sensors 214, 216, 218 are coupled with MC 83. When a failure current is detected, the circuit breaker driver 250 sends the tripping signal Sd to a control circuit 81 of the MC tripping protection circuit 80. The control circuit 81 causes the MC 83 to lose excitation so as to separate the load from a power source. In FIG. 11, the overcurrent relay 200 cooperates with a no-fuse breaker (NFB) 90. Switches 94 of the NFB 90 are coupled with the Hall sensors 214, 216, 218, respectively. When a failure current is detected, the tripping signal Sd immediately generated by the overcurrent relay triggers a tripping spring 92 of the NFB 90 to force the switches 94 to be OFF, and thereby isolating an apparatus connected with the NFB 90.

Figure 12:
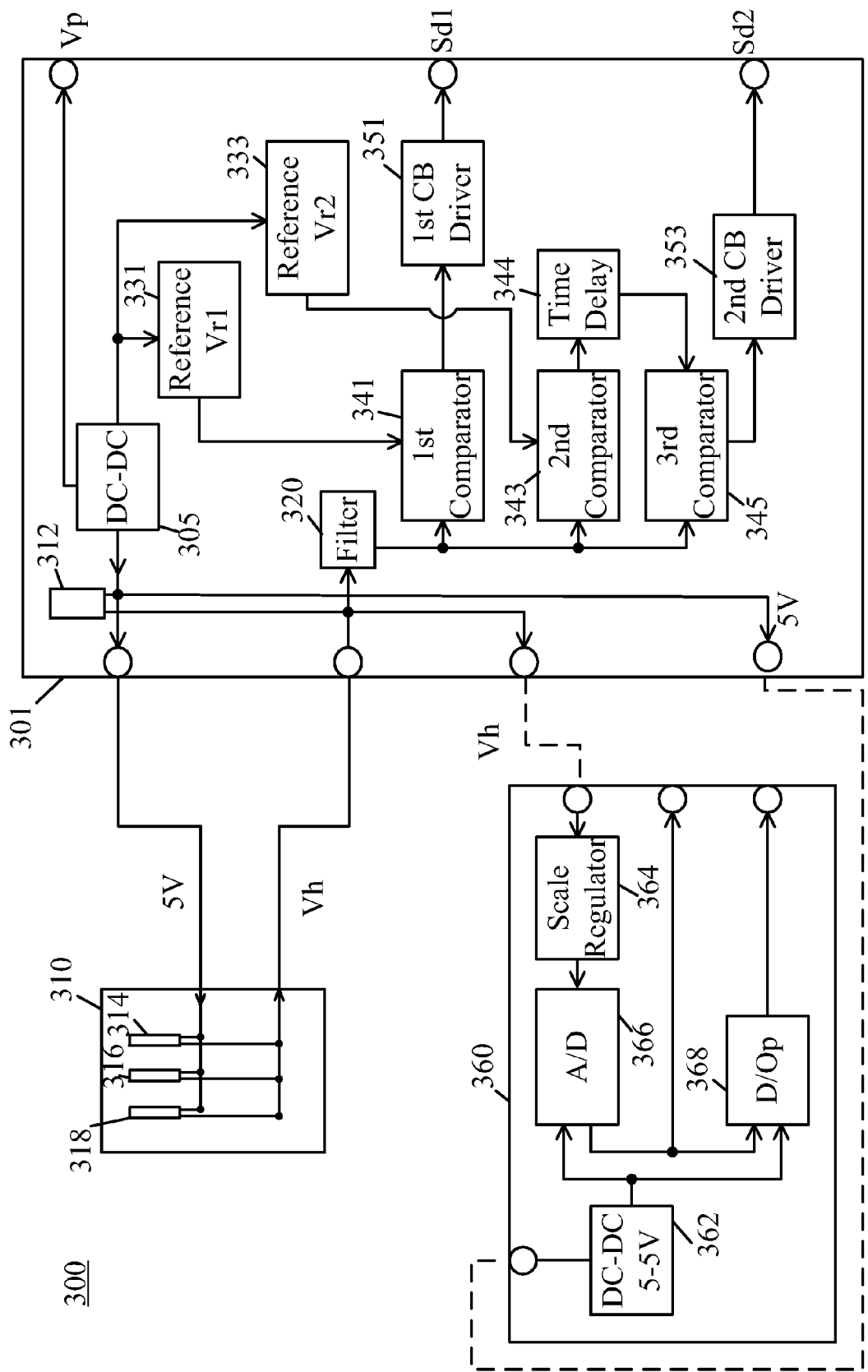
FIG. 12 is a schematic block diagram showing an overcurrent relay in accordance with a further embodiment of the present invention.

FIG. 12 is a schematic block diagram showing an overcurrent relay 300 in accordance with a further embodiment of the present invention. The overcurrent relay 300 includes three parts: an overcurrent relay main part 301, an overcurrent sensing part 310 and an overcurrent transferring part 360. The main part 301 has a DC-DC converter 305 (and/or an AC-DC rectifier), a filter 320, a first reference voltage provider 331, a second reference voltage provider 333, a first comparator 341, a second comparator 343, a time delay unit 344, a third comparator 345, a first circuit breaker (CB) driver 351, a second CB driver 353 and a built-in Hall sensor 312. The overcurrent sensing part 310 has a plurality of Hall sensors 314, 316, 318 and is an optional part. The overcurrent sensing part 310 is detachably coupled with the overcurrent relay main part 301. The overcurrent transferring part 360, which is also optional, has a DC-DC converter 362 (optional) for removing residual ripples of the DC voltage, a scale regulator 364, an analog-to-digital (A/D) converter 366 and a digital-to-optical (D/Op) converter 368. The operations of the above components will be described in detail later.

The overcurrent sensing part 310 has a plurality of additional Hall sensors such as Hall sensors 314, 316, 318 shown in this drawing. These additional Hall sensors 314, 316, 318 can be used in cooperation with the built-in Hall sensor 312 of the main part 310. For example, the four Hall sensors 312, 314, 316 and 318 can be arranged to surround a power cable (not shown).

When a failure current is sensed by the Hall sensors 312-318, a Hall voltage signal Vh is sent to the filter 320 to be filtered out a sinusoid wave, if any. As described above, an exponent wave will be left. A filtered signal Vhf from the filter 320, which has the exponent wave only, is compared with a first reference voltage Vr1 from the first reference voltage provider 331 by the first comparator 341. Once the level of the filtered signal Vhf reaches the first reference voltage Vr1, the first comparator 341 outputs a first trigger signal Co1 (e.g. a pulse) to trigger the first CB driver 351. In response, the first CB driver 351 generates a first tripping signal Sd1 to trip a circuit breaker (not shown). However, sometimes the circuit breaker does not work normally for various reasons. The overcurrent relay 300 of the present embodiment provides double protection. The filtered signal Vhf is also sent to the second comparator 343 to be compared with a second reference voltage Vr2 from the second reference voltage provider 333. The second reference voltage Vr2 is greater than the first reference voltage Vr1. If the filtered signal Vhf reaches the second reference voltage Vr2, the second comparator 343 outputs a signal Co2 in a form of a square wave (e.g. a pulse). The output Co2 of the second comparator 343 at a time point T1, for example, is delayed by the time delay unit 344 with a delayed period Δt. The delayed period Δt of the time delay unit 344 can be adjusted as desired. The delayed second comparator output signal Co2d is compared with the filtered signal Vhf at a time point T2, where T2=T1+Δt, by the third comparator 345. If the failure current still exists at time T2, that is, the circuit breaker does not work at time T2, the waveform of the filtered signal Vhf will still have the exponent wave and accordingly intersect with the waveform of the delayed second comparator output Co2d. Under such a condition, the third comparator 345 outputs a second trigger signal Co3 in a form of a square wave (e.g. a pulse) to trigger the second CB driver 353. The second CB driver 353 then outputs a second tripping signal Sd2 to trip the circuit breaker.

The overcurrent transferring part 360 is used to transfer the Hall voltage signal Vh from the Hall sensor(s) into a digital signal and/or further an optical signal. The scale regulator 364 adjusts a level of the Hall voltage signal Vh from the Hall sensor(s). The A/D converter 366 converts the analog Hall voltage signal Vh into a digital signal. The digital signal can be passed to an external device such as a conventional relay or an electric meter for further use. The D/Op converter 368 converts the digital signal from the A/D converter 366 into the optical signal, which can be transferred via an optical fiber.

Figure 13:
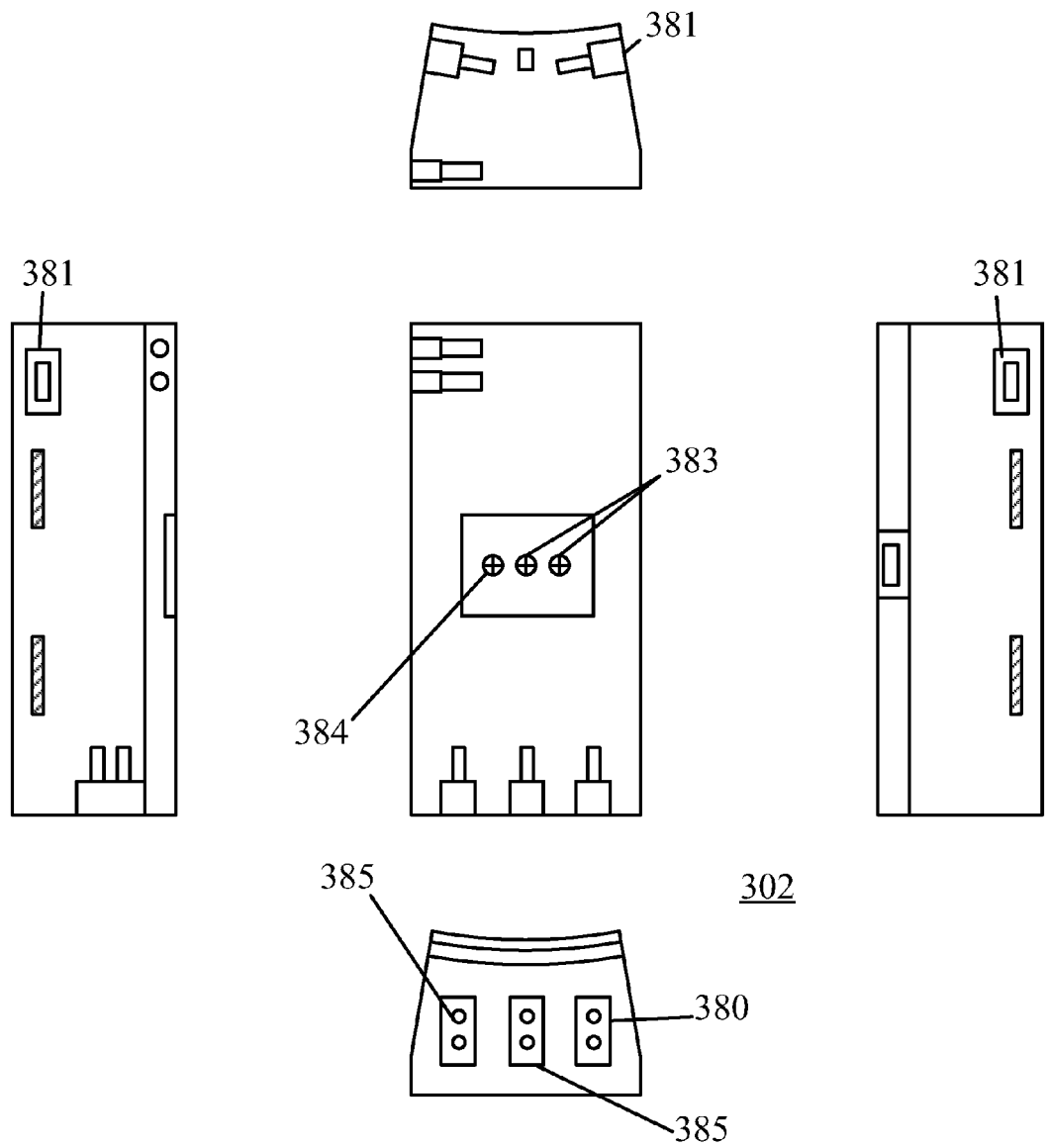
FIG. 13 shows respective side views of an exterior of a main part of the overcurrent relay in accordance with the present invention.

The overcurrent relay main part 301 can be fabricated and work as an individual overcurrent relay. FIG. 13 shows respective side views of an exterior of the main part 301 of the overcurrent relay 300 in accordance with the present invention. The main part 301 has a casing 302, on which sockets for connecting a power line and the overcurrent sensing part 310, and adjusting keys (or sticks) are provided. In the present embodiment, the overcurrent relay main part 301 has an AC/DC power socket 380, USB sockets 381, CB trip sockets 385 for connecting the overcurrent relay 300 to circuit breakers (not shown), adjusting sticks 383 for adjusting the level of the reference voltage providers 331, 333 and another adjusting stick 384 for adjusting the delay period of the time delay unit 344.

Figure 14:
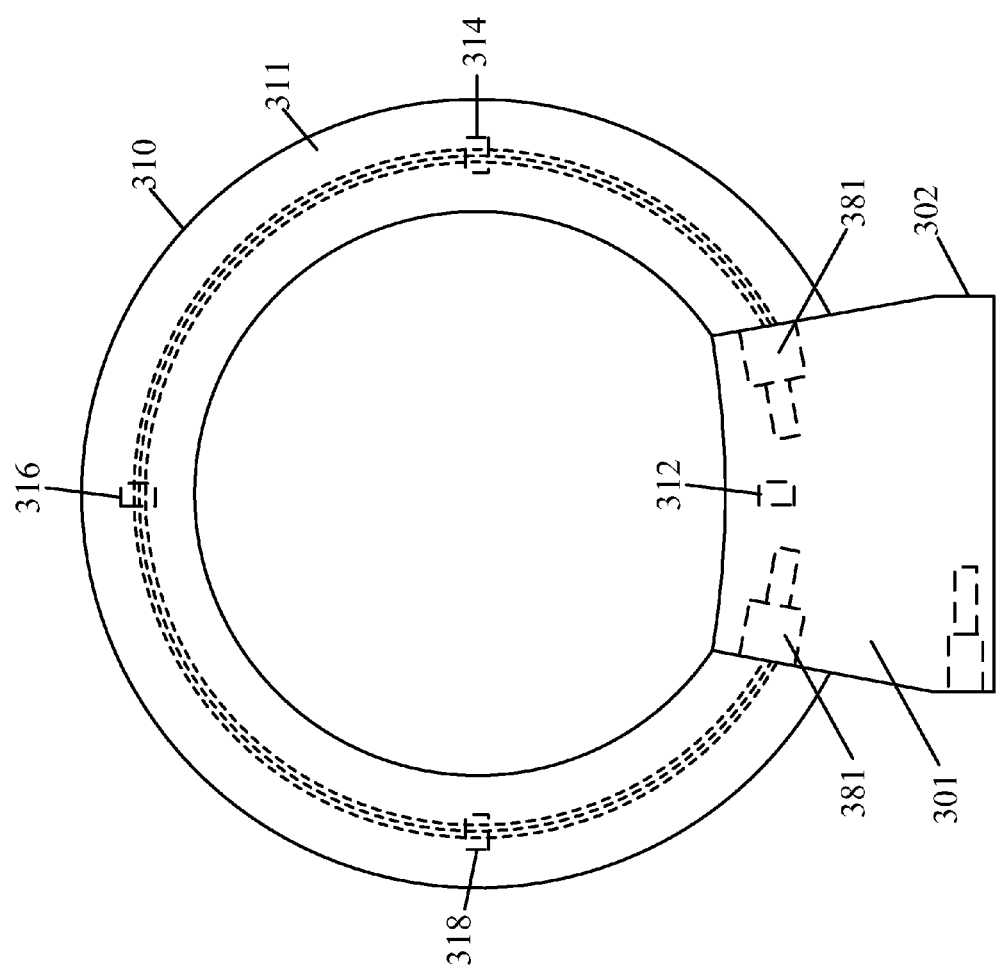
FIG. 14 shows the main part in combination with a sensing part of the overcurrent relay in accordance with the present invention.

The overcurrent sensing part 310 can be fabricated as an individual part. For example, the overcurrent sensing part 310 may include an insulating soft band 311 made of silicone, which can be separate with the main part 301 when not being used. FIG. 14 shows the main part 301 in combination with the sensing part 310 of the overcurrent relay 300. The soft band 311 has connectors such as USB connectors (not shown) at two ends. The Hall sensors 314, 316, 318 are provided on the soft band 311 and electrically connected to connectors. The overcurrent sensing part 310 is coupled to the main part 301 by connecting the USB connectors (not shown) to the USB sockets 381 of the main part 301 when being used. The USB sockets 381 are electrically coupled with the filter 320 disposed in the casing 302. To detect the failure current, the soft band 311 of the overcurrent sensing part 310 can be disposed to surround a cable, for example, and the overcurrent sensing part 310 is connected with the main part 301 by connecting the connectors thereof to the sockets 381 of the main part 301. By doing so, the Hall sensors 314, 316, 318 of the sensing part 310 and the built-in Hall sensor 312 of the main part 301 can be set around the cable.

Figure 15:
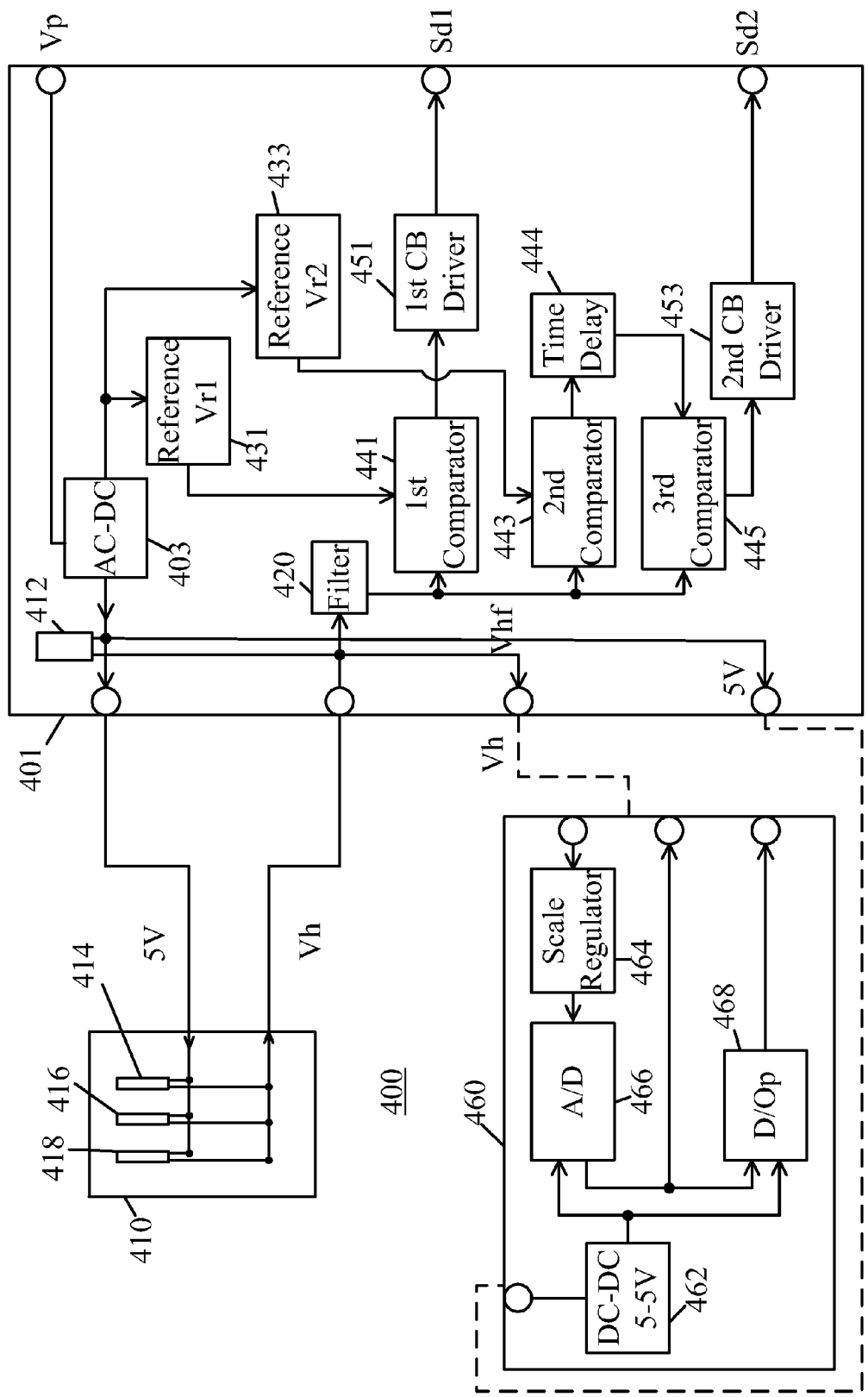
FIG. 15 is a schematic block diagram showing an overcurrent relay in accordance with still a further embodiment of the present invention.

FIG. 15 is a schematic block diagram showing an overcurrent relay 400 in accordance with still a further embodiment of the present invention. The overcurrent relay 400 is similar to the overcurrent relay 300 of FIG. 12. The like reference numbers indicate the same components in these two drawings. The only difference is that the overcurrent relay 400 has an AC-DC rectifier 403 in place of the DC-DC converter 305 in FIG. 12.

Figure 16:
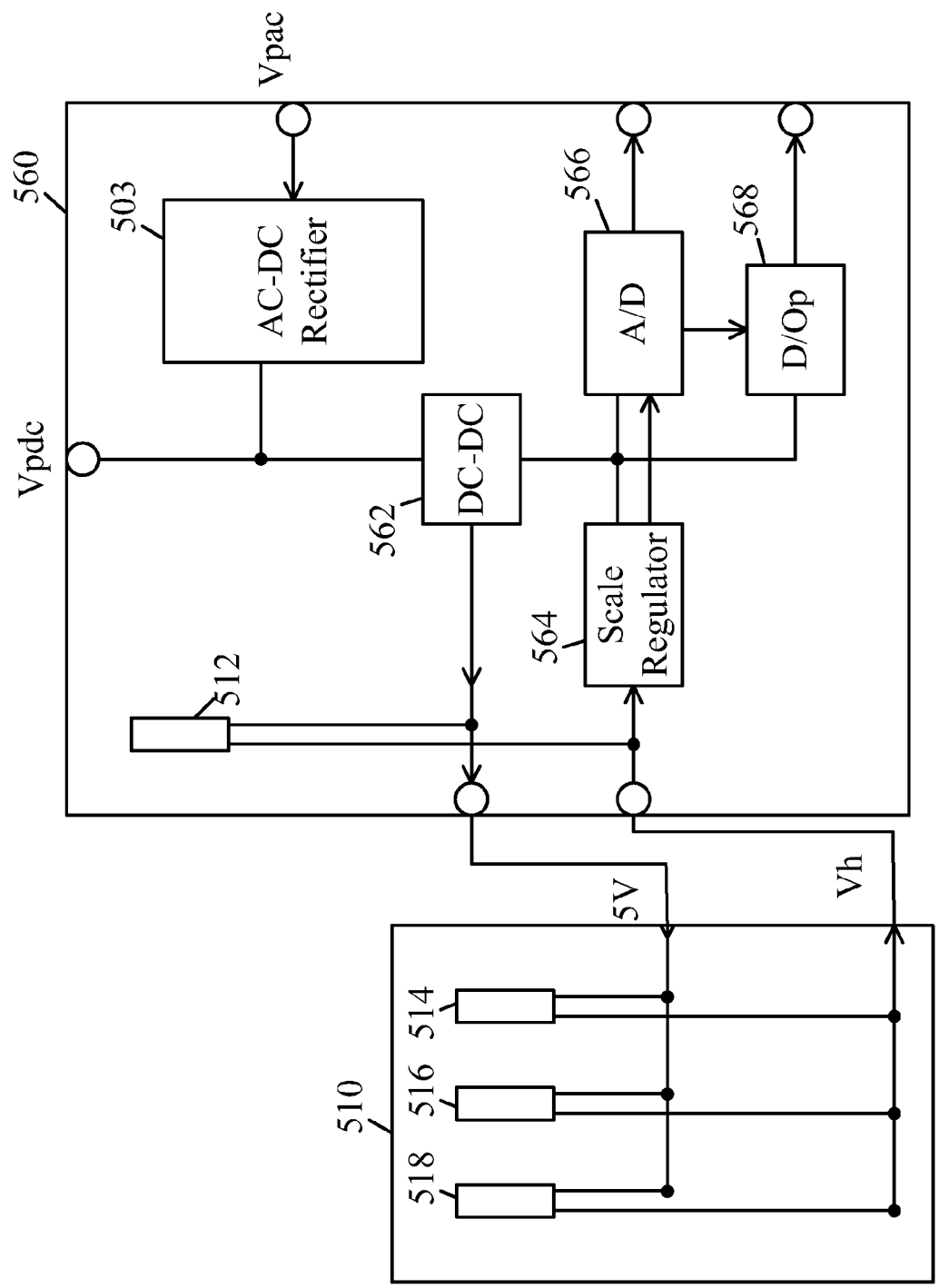
FIG. 16 is a schematic block diagram showing an overcurrent sensing/transferring device in accordance with the present invention.

FIG. 16 is a schematic block diagram showing an overcurrent sensing/transferring device 500 in accordance with the present invention. The overcurrent sensing/transferring device 500 only has the functions of detecting the failure current and transferring the detected failure current into a digital signal and/or an optical signal. That is, the overcurrent sensing/transferring device 500 does not have the function of tripping the circuit breaker (not shown). The overcurrent sensing/transferring device 500 includes a sensing part 510 and a transferring part 560. The sensing part 510 has a plurality of Hall sensors 514, 516, 518 for detecting a failure current and correspondingly outputting a Hall voltage signal. The transferring part 560 may have a built-in Hall sensor 512. Accordingly, the transferring part 560 can be used without being connected with the sensing part 510. In the case that the transferring part 560 is in combination with the sensing part 510, the Hall sensor 512 is used in cooperation with the Hall sensors 514, 516, 518. The transferring part 560 has a scale regulator 564 for adjusting the level of the Hall voltage signal. The adjusted voltage signal is converted into a digital signal by an analog-to-digital (A/D) converter 566. The digital signal can be further converted into an optical signal by a digital-to-optical (D/Op) converter 568. Similar to the overcurrent relay 100 of FIG. 5, the overcurrent sensing/transferring device 500 has an AC-DC rectifier 503 and a DC-DC converter 562 so that the device 500 can be powered by an AC power or a DC power. In practice, the exterior of the overcurrent sensing/transferring device 500 can be similar to that of the overcurrent relay 300 as shown in FIGS. 13 and 14.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An overcurrent relay comprising:
    a Hall sensor detecting a failure current and outputting a Hall voltage signal;
    a filter filtering the Hall voltage signal to output a filtered signal;
    a first reference voltage provider providing a first reference voltage, wherein the first reference voltage provider is steplessly adjustable so as to provide various required reference voltages;
    a first comparator comparing the filtered signal from the filter with the first reference voltage and outputting a first trigger signal when the filtered signal reaches the first reference voltage;
    a first circuit breaker driver being triggered by the first trigger signal to output a first driving signal for driving a circuit breaker;
    a second reference voltage provider providing a second reference voltage, which is higher than the first reference voltage, wherein the second reference voltage provider is steplessly adjustable so as to provide various required reference voltages;
    a second comparator comparing the filtered signal with the second reference voltage and outputting an output when the filtered signal reaches the second reference voltage;
    a third comparator comparing the filtered signal with the output of the second comparator and outputting a second trigger signal when the filtered signal reaches the output of the second comparator; and
    a second circuit breaker driver being triggered by the second trigger signal to output a second driving signal for driving the circuit breaker.

2. The overcurrent relay of claim 1, further comprising a time delay unit, which delays the output of the second comparator with a predetermined period of time, and the third comparator compares the filtered signal with the delayed output of the second comparator.

3. The overcurrent relay of claim 1, further comprising an analog-to-digital converter, the analog-to-digital converter converts the Hall voltage signal into a digital signal.

4. The overcurrent relay of claim 3, further comprising a digital-to-optical converter, the digital-to-optical converter converts the digital signal into an optical signal.

5. The overcurrent relay of claim 3, further comprising a scale regulator, the scale regulator adjusts a level of the Hall voltage signal before the Hall voltage signal is converted into the digital signal.

6. The overcurrent relay of claim 1, wherein the filter filters out a sinusoid wave of the Hall voltage signal and allow an exponent wave of the Hall voltage signal to pass.

7. The overcurrent relay of claim 1, wherein the first comparator outputs the first trigger signal in a form of a square wave.

8. The overcurrent relay of claim 7, wherein the first comparator outputs the first trigger signal in a form of a pulse.

9. The overcurrent relay of claim 1, wherein the first circuit breaker driver comprises a thyristor.

10. The overcurrent relay of claim 1, further comprising additional Hall sensors, the Hall sensors cooperatively detect the failure current and output the Hall voltage signal.

11. The overcurrent relay of claim 10, wherein at least some of the Hall sensors are provided on a separate sensing part, and are coupled to the filter when being used.

12. The overcurrent relay of claim 11, wherein the separate sensing part comprises a band having connectors at both ends, the additional Hall sensors are provided on the band and electrically connected with the connectors, the additional Hall sensors are electrically coupled to the filter through the connectors when being used.

13. The overcurrent relay of claim 12, further comprising a casing and sockets provided on the casing, the sockets are electrically coupled with the filter, the additional Hall sensors are coupled with the filter by connecting the connectors to the sockets when being used.

14. The overcurrent relay of claim 1, further comprising additional Hall sensors, filters and first comparators, the Hall sensors respectively detect failure currents and output Hall voltage signals, the filters respectively filter the Hall voltage signals, and the first comparators respectively compare outputs of the filters with the first reference voltage, the first comparators are connected to the circuit breaker driver.

* * * * *